Figure 1:
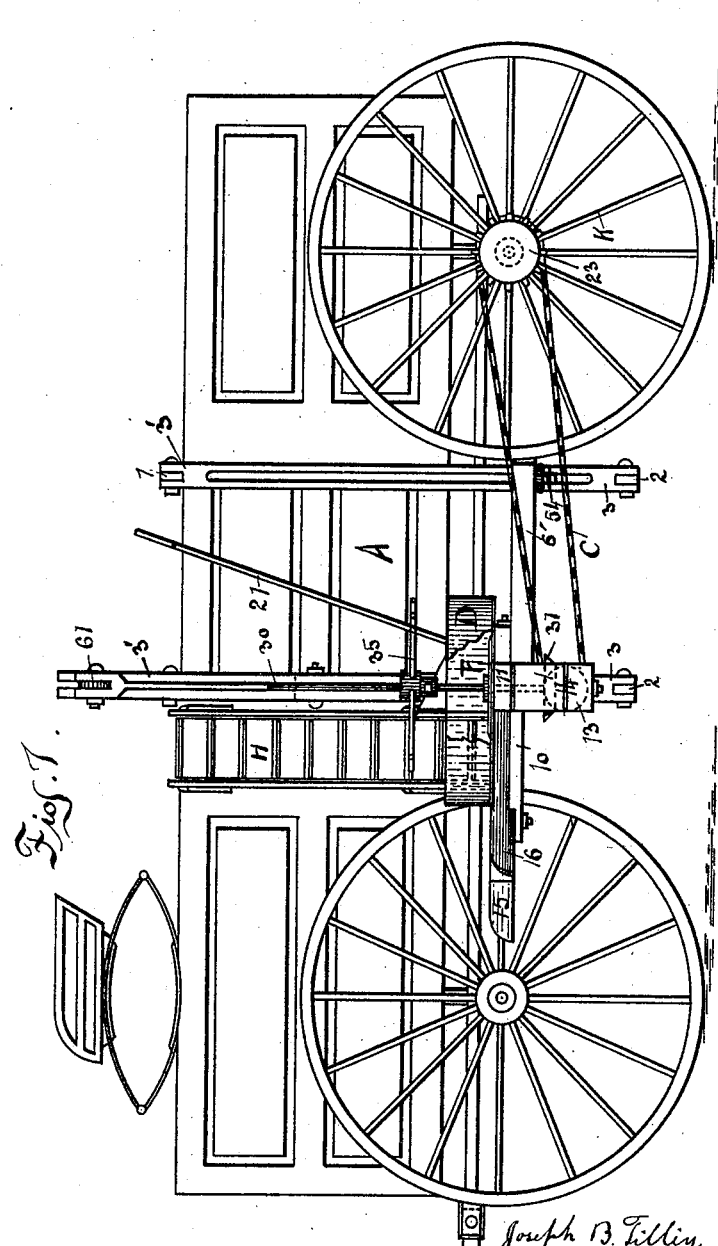

(No Model.) 3 Sheets—Sheet 1.
JOSEPH B. TILLEY, JOHN B. TILLEY & L. F. TILLEY.
KAFIR CORN HEADER.

No. 601,764. Patented Apr. 5, 1898.

WITNESSES:

Joseph B. Tilley,
John B. Tilley and
Licaneory F. Tilley INVENTORS

BY

ATTORNEY.

(No Model.) 3 Sheets—Sheet 2.

JOSEPH B. TILLEY, JOHN B. TILLEY & L. F. TILLEY.
KAFIR CORN HEADER.

No. 601,764. Patented Apr. 5, 1898.

Fig. 2.

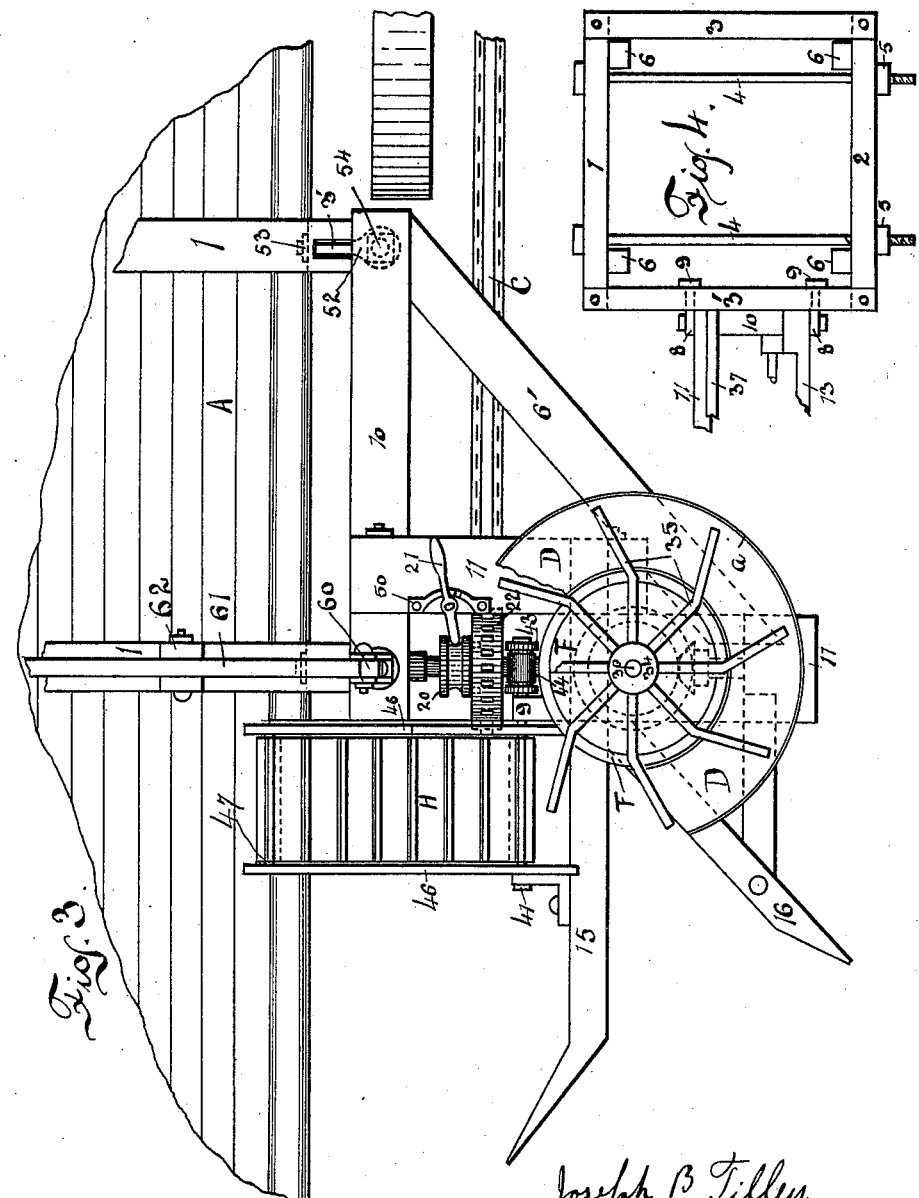

UNITED STATES PATENT OFFICE.

JOSEPH B. TILLEY, JOHN B. TILLEY, AND LICANEORY F. TILLEY, OF KEIGHLEY, KANSAS.

KAFIR-CORN HEADER.

SPECIFICATION forming part of Letters Patent No. 601,764, dated April 5, 1898.

Application filed November 16, 1896. Serial No. 612,284. (No model.)

*To all whom it may concern:*

Be it known that we, JOSEPH B. TILLEY, JOHN B. TILLEY, and LICANEORY F. TILLEY, residing at Keighley, in the county of Butler and State of Kansas, have invented certain useful Improvements in Kafir-Corn Headers; and we do hereby declare that the following is a full, clear, and exact description of the invention, such as will enable others skilled in the art to which it appertains to make and use the same, reference being had to the accompanying drawings, which form a part of this specification.

This invention relates to a new and novel improvement in attachable Kafir-corn cutters adapted to be used in conjunction with an ordinary farm-wagon.

The aim of our invention is more particularly to provide a cheap, simple, and economic corn-cutting mechanism which shall be so arranged that it can be readily attached to an ordinary farm-wagon to cut the corn and elevate it into the wagon.

Our aim is, further, to provide a device that shall be so simple that any man with ordinary mechanical skill can make and use the same.

In the accompanying drawings, Figure 1 shows a side elevation of an ordinary farm-wagon with our improved cutter as attached. Fig. 2 shows a broken enlarged detached end elevation disclosing the arrangement of the elevating mechanism. Fig. 3 shows an enlarged detached top view of our attachment, while Fig. 4 shows a broken detail of the frame.

Our invention comprises, first, a rectangular frame consisting of the upper bars 1 1, the lower bars 2 2, the side bars 3 3, and the slotted bars 3' 3', these bars being shown in detail in Fig. 4. The bars 1 and 2 are connected to the bars 3 3, so that the wagon-box which is to be encompassed by this frame may be of any length, the bars 1 and 2 being strengthened by a set of threaded bars 4 4, as is shown in Fig. 2, these bars being provided with the nuts 5. To further strengthen the frame, transverse bars 6 6 may be provided, as is shown in Fig. 4, though in the other views these bars have been eliminated, as they are simply for the purpose of strengthening the machine in exceptional cases. By this means it will be seen we provide a frame to which our mechanism is to be attached, and which frame can be adjustably and removably secured to any ordinary farm-wagon. Working within these slotted bars 3' 3' are two eyes 8 8, adjustable by means of the nuts 9, which eyes work through the slot and which eyes 8 8 support a suitable stub-frame comprising the bars 10, 11, 13, and 14, the bars 10 and 11 being further reinforced by the bar 6', as is shown in Fig. 3. Extending forward from the bar 11, which is really composed of two straight sections 11 11, secured at the center, as is shown in Fig. 3, are two gathering-arms 15 and 16, which are adapted to come within the path of the corn to be harvested, and which arms diverge from the common point, as is shown. Extending transversely between the bars 11 and 13 is a main operating-shaft B, which shaft works within the boxings 17, 18, and 19 and is provided with an ordinary clutch-pulley 20, which clutch-pulley is actuated by a lever 21, and which clutch-pulley is slidably secured to the shaft. Working adjoining to the clutch-pulley 21 is a loose chain-pulley 22, (referring now more particularly to Fig. 2,) while 23 represents an ordinary chain-pulley which is detachably secured to the hub of one of the rear wheels of the wagon and over which an ordinary chain C is made to pass in winding over the loose chain-pulley 22. As long as the wagon moves so long does this chain C actuate the loose pulley 22, and in order to operate the shaft B it is simply necessary to throw the clutch 20 into contact with the gear 22 to operate the main driving-shaft B. As soon as the clutch is thrown out the working mechanism of course rides dead.

Situated above the bar 11 is an approximately circular trough D, which has a portion removed and is provided with the upwardly-extending flange a, and within the bottom of which is a rotating cutting-knife F, which knife may be in the shape of an ordinary cutting-disk or in the form of an ordinary circular saw, this cutting-disk projecting beyond the union of the gathering-arms 15 and 16.

Working within the boxing 19 from above is an ordinary shaft 30, which shaft is provided with a bevel-gear 31, fixed to said shaft and to which shaft is also fixed the cutting-disk F, this shaft further being provided with the reel 35, secured to the hub 34, and the arms of which are adapted to throw the corn sidewise upon a suitable elevator H, the reel-arms 35 being bent slightly angular at the end, as is shown in the top view in Fig. 3.

Secured to the main shaft B is a bevel-gear 36, which provides a rotary motion to the shaft 30 in meshing with the bevel-gear 31, as will be noticed in referring to Fig. 2.

To further strengthen the framework and provide a rigid bearing for the shaft 30, we provide the brace-bar 37. (Also shown in Fig. 4.) Secured to the shaft B is a spool 40, above which at right angles is positioned a shaft 41, (see Fig. 3,) which is also provided with a spool 43, through which a belt 44 works, as is shown in Figs. 2 and 3.

Extending from the frame-piece 15 is an elevator-frame comprising the side pieces 45 45, to which are secured the upper fenders 46 and which at its upper end has a shaft 47, over which an endless elevator H is made to pass, this elevator extending to the top of the frame-piece 1. This elevator is in belt connection with the shaft B by virtue of the spools 40 and 43 and the belt 44.

Referring to Fig. 1, it will be noticed that the bars 3' 3' are slotted. This is done so that the cutting mechanism, embracing all of the apparatus excepting the supporting-frame, may be raised or lowered. This is accomplished in providing the frame-pieces 13 with bolts 52, which bolts have the nuts 53 and which bolts in turn are connected by a second bolt 54, so that a pivoted movement is allowed the bolt 52, so that this frame is slidably held within the slotted bars 3' 3', being supported by means of the bar 60, which bar is secured to the frame-pieces 11 and bolts 52, the bar 60 in turn being held by the lever 61, supported within the standard 62, as is shown in Figs. 2 and 3. Secured to the lever 61 is an ordinary spring 63, which is adapted to work within the openings 64 within the standard 65, so that it will be seen that the supporting-frame can be adjustably secured and held by means of this lever 61. This enables the operator to cut the corn either high or low, as desired.

The operation of our device would be as follows: The driving mechanism being in chain connection C with one of the rear wheels and the chain-gear 22 being thrown into connection with the shaft B, the elevator H, the cutting-knife F, and the reel 35 would be simultaneously operated. Now as the machine is fed against the corn, which would by means of the gathering-arms 15 and 16 be directed toward the knife F, this knife would cut the corn, and as it is cut it would be thrown by means of the reel 35 upon the elevator H and be elevated into the wagon A, it being intended that an operator be stationed at the head of the elevator to aid in the unloading of the corn.

Now, having thus described our said invention, what we claim as new, and desire to secure by United States Letters Patent, is—

The combination, in a corn-header adapted to be used in connection with an ordinary wagon, of the following instrumentalities, to wit: a supporting-frame adjustably secured to said wagon, the gathering-arms, 15 and 16, secured to said frame, the main operating-shaft, B, suitably journaled within said supporting-frame, the clutch-section, 20, working upon said shaft, said clutch-section being actuated by the lever, 21, the loose chain-pulley, 22, secured to said shaft adjacent to said clutch-pulley, said loose chain-pulley being in chain connection with one of the wheels of said wagon, the approximately circular trough, D, positioned above said shaft, B, the flange, a, forming part of said trough, the rotating cutting-knife, F, within said trough, said knife projecting beyond the union of said gathering-arms, 15 and 16, the shaft, 30, secured to said cutter and further being provided with the bevel-gear, 31, the reel, 35, upon said shaft, 30, the elevator, H, positioned below said reel, 35, the bevel-gear, 36, secured to the shaft, B, meshing with said gear, 31, the spool, 40, secured to said shaft, B, the shaft, 41, positioned at right angles above said spool, 40, said shaft, 41, being provided with a spool, 43, and the belt, 44, working upon said spools, 40 and 43, all arranged to operate substantially in the manner set forth.

In testimony whereof we affix our signatures in presence of two witnesses.

JOSEPH B. TILLEY.
JOHN B. TILLEY.
LICANEORY F. TILLEY.

Witnesses:
C. W. WATERS,
J. U. GROVE.